United States Patent
Muñoz de la Torre Alonso et al.

(10) Patent No.: US 12,439,465 B2
(45) Date of Patent: Oct. 7, 2025

(54) SESSION IDENTIFIER HANDLING FOR CO-LOCATED USER PLANE GATEWAYS

(71) Applicant: Telefonaktiebolaget LM Ericsson (publ), Stockholm (SE)

(72) Inventors: Miguel Angel Muñoz de la Torre Alonso, Madrid (ES); Carlos Jimenez Cordon, Madrid (ES)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 455 days.

(21) Appl. No.: 17/922,190

(22) PCT Filed: Jul. 28, 2020

(86) PCT No.: PCT/EP2020/071210
§ 371 (c)(1),
(2) Date: Oct. 28, 2022

(87) PCT Pub. No.: WO2022/002419
PCT Pub. Date: Jan. 6, 2022

(65) Prior Publication Data
US 2023/0180311 A1     Jun. 8, 2023

(30) Foreign Application Priority Data

Jun. 30, 2020  (EP) ..................................... 20382579

(51) Int. Cl.
*H04W 76/12*     (2018.01)
*H04W 76/11*     (2018.01)
*H04W 88/16*     (2009.01)

(52) U.S. Cl.
CPC ............ *H04W 76/12* (2018.02); *H04W 76/11* (2018.02); *H04W 88/16* (2013.01)

(58) Field of Classification Search
CPC ...... H04W 76/12; H04W 76/11; H04W 88/16
See application file for complete search history.

(56) References Cited

U.S. PATENT DOCUMENTS 10,728,817 B1 *    7/2020    Kaki .................... H04W 36/16
2019/0261213 A1 *  8/2019    Palnati .............. H04W 28/0284

FOREIGN PATENT DOCUMENTS

| JP | 2020025351 A | * | 2/2020 | ............. H04L 12/14 |
| WO | WO-2017110650 A1 | * | 6/2017 | |
| WO | 2019024981 A1 | | 2/2019 | |

OTHER PUBLICATIONS

3rd Generation Partnership Project, "3rd Generation Partnership Project; Technical Specification Group Services and System Aspects; Architecture enhancements for control and user plane separation of EPC nodes; Stage 2 (Release 16)", Technical Specification, 3GPP TS 23.214 V16.0.0, Jun. 1, 2019, pp. 1-92, 3GPP.

(Continued)

*Primary Examiner* — Saad A. Waqas
(74) *Attorney, Agent, or Firm* — Weisberg I.P. Law, P.A.

(57) ABSTRACT

A technique for transmitting and using a session identifier of a session between a user plane gateway and a control plane gateway is disclosed. In a method implementation, a third gateway, GW, in a Control Plane, CP, of an Evolved Packet Core, EPC, transmits, to a fourth GW in the CP, a session identifier of a first session established between a second GW in a User Plane, UP, of the EPC and the third GW, wherein the second GW is co-located with a first GW in the UP and wherein the first GW has a communication interface to the fourth GW. The fourth GW may receive the session identifier from the third GW and provide the session identifier to the first GW. The first GW may receive a data packet, forward the data packet to the second GW and provide, to the second GW, the session identifier. The second GW may receive the data packet from the first GW and obtain the session identifier from the first GW.

16 Claims, 11 Drawing Sheets

(56) References Cited

OTHER PUBLICATIONS

3rd Generation Partnership Project, "3rd Generation Partnership Project; Technical Specification Group Services and System Aspects; General Packet Radio Service (GPRS) enhancements for Evolved Universal Terrestrial Radio Access Network (E-UTRAN) access (Release 16)", Technical Specification, 3GPP TS 23.401 V16.5.0, Dec. 1, 2019, pp. 1-436, 3GPP.

3rd Generation Partnership Project, "3rd Generation Partnership Project; Technical Specification Group Core Network and Terminals; Interface between the Control Plane and the User Plane Nodes; Stage 3 (Release 16)", Technical Specification, 3GPP TS 29.244 V16.2.0, Dec. 1, 2019, pp. 1-281, 3GPP.

Nokia et al., "Combined Sxa-Sxb for combined S/P-GW", SA WG2 Meeting #114, Sophia Antipolis, France, Apr. 11, 2016, pp. 1-4, S2-162068, 3GPP.

* cited by examiner

602

Transmit, by a third Gateway (GW), to a fourth GW in a Control Plane of an Evolved Packet Core (EPC), a session identifier of a session established between a second GW in a User Plane (UP) of the EPC and the third GW, wherein the second GW is co-located with a first GW in the UP and wherein the first GW has a communication interface to the fourth GW

Fig. 6

SESSION IDENTIFIER HANDLING FOR CO-LOCATED USER PLANE GATEWAYS

TECHNICAL FIELD

The present disclosure generally relates to session identifier handling for co-located user plane gateways in a core network domain. In more detail, the disclosure relates to transmitting and using a session identifier of a session between a user plane gateway and a control plane gateway. The technique can be implemented as a device, as a method, as a system, as a computer program and as a computer-readable medium.

BACKGROUND

Modern wireless communication networks have an access network domain and a core network (CN) domain. The access network domain may be implemented as a radio access network (RAN) that comprises base stations for providing wireless network access to terminal devices (e.g., smartphones, tablet computers and Internet of Things (IoT) devices) and. The CN domain, among other things, connects the terminal devices served by the access network domain to other networks. Such other networks include content provider networks that deliver, often via the Internet, application services. Typical application services include instant messaging (IM) and audio or video streaming.

The CN domain of many wireless communication networks is split into a Control Plane (CP) on the one hand and a User Plane (UP) on the other. This splitting is also denoted Control and User Plane Separation (CUPS). Control signaling within and across the CN domain takes place on the CP, whereas application traffic (e.g., data packets) is transported on the UP.

An Evolved Packet Core (EPC) as CN domain comprises a Serving Gateway (SGW), and a Packet Data Network- (PDN-) Gateway (PGW). In case CUPS is implemented in the EPC, the SGW is separated into a Serving Gateway Control Plane Function (SGW-C) in the CP, and a Serving Gateway User Plane Function (SGW-U) in the UP. Similarly, the PGW is separated into a PDN Gateway Control Plane Function (PGW-C) in the CP, and a PDN Gateway User Plane Function (PGW-U) in the UP. Due to this separation, the aforementioned UP and CP functions may be referred to as being different gateways (GWs), namely SGW-C, SGW-U, PGW-C and PGW-U.

The SGW-U and the PGW-U may be co-located. The traffic handling in the CN domain with CUPS in case of SGW-U/PGW-U co-location is not efficient when using the currently known techniques. For instance, for each data packet in the UP, many procedures are currently duplicated.

SUMMARY

There is a need for a technique that provides a higher efficiency for co-located user plane gateways in a core network domain.

According to a first aspect, a network node is provided that is configured as a first Gateway (GW) in a User Plane (UP) of an Evolved Packet Core (EPC) with Control and User Plane Separation (CUPS), the first GW being configured to: receive a data packet; forward the data packet to a second GW in the UP, the second GW being co-located with the first GW; and provide, to the second GW, a session identifier of a first session established between a third GW in a Control Plane (CP) of the EPC and the second GW.

As understood herein, a data packet is not limited to any layer of the Open Systems Interconnection (OSI) model. It could in particular be realized by any Protocol Data Unit (PDU) on any OSI layer (e.g., a layer 2, a layer 3 or a layer 4 PDU)

The network may be further configured to provide the session identifier of the first session by sending it with or in the forwarded data packet.

In one example, the network node is further configured to forward the data packet while avoiding tunnel creation under a General Packet Radio Service Tunneling Protocol (GTP) between the first GW and the second GW.

The network node may be further configured to: match the received data packet with a second session established between a fourth GW in the CP and the first GW, wherein the fourth GW has a communication interface to the third GW; select at least one Packet Detection Rule (PDR) associated with the matching second session; and obtain the session identifier of the first session based on the selected PDR. For example, the network node is further configured to obtain the session identifier of the first session from at least one Forwarding Action Rule (FAR) associated with the selected PDR. The network node may be further configured to forward the data packet in accordance with the at least one FAR. In one variant, the at least one FAR does not include an Outer Header Creation Information Element (OHC-IE).

The network node may be further configured to obtain the session identifier of the first session from a fifth GW in the CP before receiving the data packet, wherein the fifth GW has a communication interface to the third GW. The network node in one example is further configured to associate the session identifier of the first session obtained from the fifth GW with a Packet Detection Rule (PDR). The network node may be further configured to include the session identifier of the first session obtained from the fifth GW in at least one Forwarding Action function (FAR) associated with the PDR. The at least one FAR for example does not include an Outer Header Creation Information Element (OHC-IE). The fifth GW may correspond to the fourth GW. The term "fifth GW" as used herein may thus be replaced by the term "fourth GW" and/or vice versa.

The network node may be further configured to transmit a capability indication to a sixth GW in the CP, wherein the sixth GW has a communication interface to the third GW and the capability indication indicates that the first GW is co-located with another GW in the UP. The network node is for example further configured to transmit the capability indication in a Packet Forwarding Control Protocol (PFCP) Association Request message. The sixth GW may correspond to the fourth GW. The term "sixth GW" as used herein may thus be replaced by the term "fourth GW" and/or vice versa. The sixth GW may correspond to the fifth GW. The term "sixth GW" as used herein may thus be replaced by the term "fifth GW" and/or vice versa.

The first GW may be physically co-located with the second GW. The first GW is for example implemented in a same network node or in a same co-location center as the second GW. The network node may be configured as both the first and the second GW. Alternatively or additionally, the third GW may be physically co-located with the fourth GW. The third GW is for example implemented in a same network node or in a same co-location center as the fourth GW.

The first session established between the second GW and the third GW may use a Packet Forwarding Control Protocol (PFCP). The first session is for example established over an Sx interface between the second GW and the third GW.

Alternatively or additionally, the second session established between the fourth GW and the first GW may use a Packet Forwarding Control Protocol (PFCP). The second session is for example established over an Sx interface between the fourth GW and the first GW.

According to the present disclosure, the Sx interface may generally be a so-called Sxa or Sxb interface. These interfaces are, for example, specified by the 3$^{rd}$ Generation Partnership Program, 3GPP, EPC CUPS reference architecture for 5$^{th}$ Generation (5G) communication networks.

In one variant also referred to as downlink variant herein, the first GW may be a Packet Data Network Gateway in the UP (PGW-U), the second GW may be a Serving Gateway in the UP (SGW-U), and the third GW may be a Serving Gateway in the CP (SGW-C). For example, the fourth GW is a Packet Data Network Gateway in the CP (PGW-C). The third GW is for example configured to transmit a GW identifier of the second GW to the fourth GW. The fourth GW may be configured to: receive, from the third GW, a GW identifier of the second GW; and select the first GW based on the GW identifier from a plurality of first GWs in the UP.

In another variant also referred to as uplink variant herein, the first GW may be a Serving Gateway in the UP (SGW-U), the second GW may be a Packet Data Network Gateway in the UP (PGW-U), and the third GW may be a Packet Data Network Gateway in the CP (PGW-C). For example, the fourth GW is a Serving Gateway in the CP (SGW-C). The fourth GW is for example configured to transmit a GW identifier of the first GW to the third GW. The third GW may be configured to: receive, from the fourth GW, a GW identifier of the first GW; and select the second GW based on the GW identifier from a plurality of second GWs in the UP.

According to a second aspect, a network node is provided that is configured as a second Gateway (GW) in a User Plane (UP) of an Evolved Packet Core (EPC) with Control and User Plane Separation (CUPS), the second GW being configured to: receive a data packet from a first GW in the UP of the EPC, the first GW being co-located with the second GW; and obtain, from the first GW, a session identifier of a first session established between a third GW in a Control Plane (CP) of the EPC and the second GW.

The network node may be further configured to obtain the session identifier of the first session by extracting it from the received data packet.

In one example, the network node is further configured to receive the data packet while avoiding tunnel creation under a General Packet Radio Service Tunneling Protocol (GTP) between the first GW and the second GW.

The network node may be further configured to select at least one Packet Detection Rule (PDR) associated with the first session identified by the session identifier, from a plurality of PDRs. In one variant, the network node is further configured to select the at least one PDR without evaluating at least one parameter chosen from Network Instance (NI), Fully Qualified Tunnel Endpoint Identifier (F-TEID), and User Equipment Internet Protocol Address (UEIP). For example, the network node is further configured to trigger an action to be performed with the data packet based on at least one Forwarding Action Rule (FAR) associated with the selected PDR. In one variant, the at least one FAR does not comprise an Outer Header Removal Information Element (OHR-IE).

The network node may be further configured to transmit a capability indication to the third GW, the capability indication indicating that the second GW is co-located with another GW in the UP. For example, the network node is further configured to transmit the capability indication in a Packet Forwarding Control Protocol (PFCP) Association Request message.

The first GW may be physically co-located with the second GW. The first GW is for example implemented in a same network node or in a same co-location center as the second GW. The network node may be configured as both the first and the second GW. A fourth GW may be provided in the CP, wherein the fourth GW has a communication interface to the third GW. The third GW may be physically co-located with the fourth GW. The third GW is for example implemented in a same network node or in a same co-location center as the fourth GW.

The first session established between the second GW and the third GW may use a Packet Forwarding Control Protocol (PFCP). The first session is for example established over an Sx interface between the second GW and the third GW.

In one variant also referred to as downlink variant herein, the first GW may be a Packet Data Network Gateway in the UP (PGW-U), the second GW may be a Serving Gateway in the UP (SGW-U), and the third GW may be a Serving Gateway in the CP (SGW-C). For example, the fourth GW is a Packet Data Network Gateway in the CP (PGW-C). The third GW is for example configured to transmit a GW identifier of the second GW to the fourth GW. The fourth GW may be configured to: receive, from the third GW, a GW identifier of the second GW; and select the first GW based on the GW identifier from a plurality of first GWs in the UP.

In another variant also referred to as uplink variant herein, the first GW may be a Serving Gateway in the UP (SGW-U), the second GW may be a Packet Data Network Gateway in the UP (PGW-U), and the third GW may be a Packet Data Network Gateway in the CP (PGW-C). For example, the fourth GW is a Serving Gateway in the CP (SGW-C). The fourth GW is for example configured to transmit a GW identifier of the first GW to the third GW. The third GW may be configured to: receive, from the fourth GW, a GW identifier of the first GW; and select the second GW based on the GW identifier from a plurality of second GWs in the UP.

According to a third aspect, a network node is provided that is configured as a third Gateway (GW) in a Control Plane (CP) of an Evolved Packet Core (EPC) with Control and User Plane Separation (CUPS), the third GW being configured to transmit, to a fourth GW in the CP of the EPC, a session identifier of a first session established between a second GW in a User Plane (UP) of the EPC and the third GW, wherein the second GW is co-located with a first GW in the UP and wherein the first GW has a communication interface to the fourth GW.

The network node may be further configured to transmit the session identifier of the first session over an S5/8 interface between the third GW and the fourth GW. In one example, the network node is further configured to transmit the session identifier of the first session in a S5/8-C Create Session message.

For example, the network node is further configured to: receive, from the second GW, a capability indication indicating that the second GW is co-located with another GW in the UP; and select, based on the capability indication, the second GW from a plurality of second GWs in the UP.

The third GW may be physically co-located with the fourth GW. The third GW is for example implemented in a same network node or in a same co-location center as the fourth GW. The network node may be configured as both the third GW and the fourth GW. Alternatively or additionally, the first GW may be physically co-located with the second GW. The first GW is for example implemented in a same network node or in a same co-location center as the second GW.

The first session established between the second GW and the third GW may use a Packet Forwarding Control Protocol (PFCP). The first session is for example established over an Sx interface between the second GW and the third GW.

In one variant also referred to as downlink variant herein, the first GW may be a Packet Data Network Gateway in the UP (PGW-U), the second GW may be a Serving Gateway in the UP (SGW-U), and the third GW may be a Serving Gateway in the CP (SGW-C). For example, the fourth GW is a Packet Data Network Gateway in the CP (PGW-C). The third GW is for example configured to transmit a GW identifier of the second GW to the fourth GW. The fourth GW may be configured to: receive, from the third GW, a GW identifier of the second GW; and select the first GW based on the GW identifier from a plurality of first GWs in the UP.

In another variant also referred to as uplink variant herein, the first GW may be a Serving Gateway in the UP (SGW-U), the second GW may be a Packet Data Network Gateway in the UP (PGW-U), and the third GW may be a Packet Data Network Gateway in the CP (PGW-C). For example, the fourth GW is a Serving Gateway in the CP (SGW-C). The fourth GW is for example configured to transmit a GW identifier of the first GW to the third GW. The third GW may be configured to: receive, from the fourth GW, a GW identifier of the first GW; and select the second GW based on the GW identifier from a plurality of second GWs in the UP.

According to a fourth aspect, a network node is provided that is configured as a fourth Gateway (GW) in a Control Plane (CP) of an Evolved Packet Core (EPC) with Control and User Plane Separation (CUPS), the fourth GW being configured to: receive, from a third GW in the CP, a session identifier of a first session established between a second GW in a User Plane (UP) of the EPC and the third GW; and provide the session identifier of the first session to a first GW in the UP, wherein the first GW is co-located with the second GW.

The network node may be further configured to trigger the first GW to associate the session identifier of the first session with a Packet Detection Rule (PDR). For example, the network node is further configured to trigger the first GW to include the session identifier of the first session in at least one Forwarding Action Rule (FAR) associated to the PDR. In one variant, the at least one FAR does not include an Outer Header Creation Information Element (OHC-IE).

The network node may be further configured to: receive, from the first GW, a capability indication indicating that the first GW is co-located with another GW in the UP; and select, based on the capability indication, the first GW from a plurality of first GWs in the UP.

The third GW may be physically co-located with the fourth GW. The third GW is for example implemented in a same network node or in a same co-location center as the fourth GW. The network node may be configured as both the third GW and the fourth GW. Alternatively or additionally, the first GW may be physically co-located with the second GW. The first GW is for example implemented in a same network node or in a same co-location center as the second GW.

The first session established between the second GW and the third GW may use a Packet Forwarding Control Protocol (PFCP). The first session is for example established over an Sx interface between the second GW and the third GW.

In one variant also referred to as downlink variant herein, the first GW may be a Packet Data Network Gateway in the UP (PGW-U), the second GW may be a Serving Gateway in the UP (SGW-U), and the third GW may be a Serving Gateway in the CP (SGW-C). For example, the fourth GW is a Packet Data Network Gateway in the CP (PGW-C). The third GW is for example configured to transmit a GW identifier of the second GW to the fourth GW. The fourth GW may be configured to: receive, from the third GW, a GW identifier of the second GW; and select the first GW based on the GW identifier from a plurality of first GWs in the UP.

In another variant also referred to as uplink variant herein, the first GW may be a Serving Gateway in the UP (SGW-U), the second GW may be a Packet Data Network Gateway in the UP (PGW-U), and the third GW may be a Packet Data Network Gateway in the CP (PGW-C). For example, the fourth GW is a Serving Gateway in the CP (SGW-C). The fourth GW is for example configured to transmit a GW identifier of the first GW to the third GW. The third GW may be configured to: receive, from the fourth GW, a GW identifier of the first GW; and select the second GW based on the GW identifier from a plurality of second GWs in the UP.

According to a fifth aspect, a system is provided that comprises at least one network node according to the first or the second aspect, and at least one network node according to the third or the fourth aspect. The system may comprise one network node according to the first aspect, one network node according to the second aspect, one network node according to the third aspect and one network node according to the fourth aspect.

According to a sixth aspect, a method is provided that is performed by a first gateway (GW) in a User Plane (UP) of an Evolved Packet Core (EPC) with Control and User Plane Separation (CUPS), the method comprising: receiving a data packet; forwarding the data packet to a second GW in the UP, the second GW being co-located with the first GW; and providing, to the second GW, a session identifier of a first session established between a third GW in a Control Plane (CP) of the EPC and the second GW. The method may be performed by the network node according to the first aspect.

According to a seventh aspect, a method is provided that is performed by a second gateway (GW) in a User Plane (UP) of an Evolved Packet Core (EPC) with Control and User Plane Separation (CUPS), the method comprising: receiving a data packet from a first GW in the UP of the EPC, the first GW being co-located with the second GW; and obtaining, from the first GW, a session identifier of a first session established between a third GW in a Control Plane (CP) of the EPC and the second GW. The method may be performed by the network node according to the second aspect.

According to an eighth aspect, a method is provided that is performed by a third gateway (GW) in a User Plane (UP) of an Evolved Packet Core (EPC) with Control and User Plane Separation (CUPS), the method comprising transmitting, to a fourth GW in the CP of the EPC, a session identifier of a first session established between a second GW in a User Plane (UP) of the EPC and the third GW, wherein the second GW is co-located with a first GW in the UP and wherein the first GW has a communication interface to the fourth GW. The method may be performed by the network node according to the third aspect.

According to a ninth aspect, a method is provided that is performed by a fourth gateway (GW) in a User Plane (UP) of an Evolved Packet Core (EPC) with Control and User Plane Separation (CUPS), the method comprising: receiving, from a third GW in the CP, a session identifier of a first session established between a second GW in a User Plane (UP) of the EPC and the third GW; and providing the session identifier of the first session to a first GW in the UP, wherein the first GW is co-located with the second GW. The method may be performed by the network node according to the fourth aspect.

According to a tenth aspect, a computer program is provided that comprises instructions which, when the program is executed by a processor, cause the processor to carry out the method according to one or more of the sixth, seventh, eighth or ninth aspect. The program may be embodied in the form of a computer program product. The computer program may configured the network node described herein as one or more of the first, the second, the third or the fourth GW.

According to an eleventh aspect, a computer-readable medium is provided that comprises instructions which, when executed by a processor, cause the processor to carry out the method according to one or more of the sixth, seventh, eighth or ninth aspect. The computer-readable medium may store the program of the tenth aspect.

BRIEF DESCRIPTION OF THE DRAWINGS

Further aspects, details and advantages of the present disclosure will become apparent from the detailed description of exemplary embodiments below and from the drawings, wherein:

FIGS. 4 to 7 illustrate flow diagrams of four method embodiments of the present disclosure.

DETAILED DESCRIPTION

Figure 1:
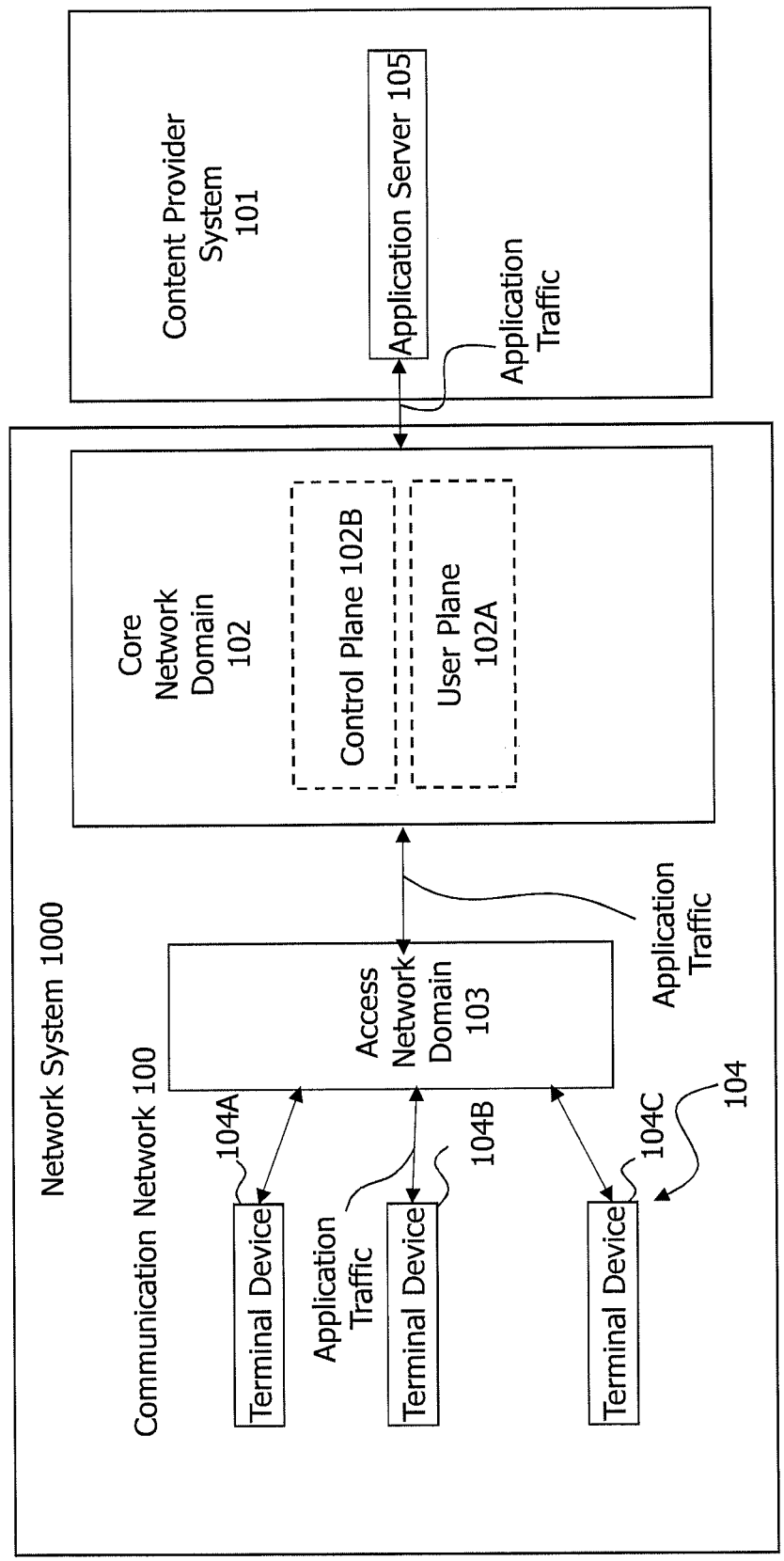
FIG. 1 is a diagram illustrating a network system embodiment in accordance with the present disclosure.

In the following description, for purposes of explanation and not limitation, specific details are set forth in order to provide a thorough understanding of the present disclosure. It will be apparent to one skilled in the art that the present disclosure may be practiced in other embodiments that depart from these specific details.

While, for example, some embodiments of the following description may focus on an exemplary core network configuration in accordance with 5G specifications, the present disclosure is not limited in this regard.

Those skilled in the art will further appreciate that the steps, services and functions explained herein may be implemented using individual hardware circuits, using software functioning in conjunction with a programmed microprocessor or general purpose computer, using one or more application specific integrated circuits (ASICs) and/or using one or more digital signal processors (DSP). It will also be appreciated that when the present disclosure is described in terms of a method, it may also be embodied in one or more processors and one or more memories coupled to the one or more processors, wherein the one or more memories store one or more computer programs that perform the steps, services and functions disclosed herein when executed by one or more processors.

In the following description of exemplary embodiments, the same reference numerals denote the same or similar components.

FIG. 1 illustrates an embodiment of a network system 1000 in which techniques in accordance with the present disclosure can be implemented. As shown in FIG. 1, the network system 1000 comprises a wireless communication network 100 operated by a network operator. The wireless communication network 100 is a mobile (and, in particular, a cellular) communication network. The network system 1000 further comprises a content provider system 101 operated by a content provider (sometimes also called service provider). The content provider system 101 provides an application service (such as an IM service or a video or audio streaming service).

As shown in FIG. 1, the communication system 100 comprises a Core Network Domain (CND) 102 and a wireless Access Network Domain (AND) 103, such as a (radio) access network, (R)AN. At least the CND 102 comprises a User Plane (UP) 102A for transporting application traffic and a Control Plane (CP) 102B for transporting control signaling. In FIG. 1, the UP 102A and the CP 102B are only illustrated for the CND 102, although the AND 103 may similarly be separated into a UP and a CP.

A user equipment (UE) 104A constitutes an exemplary terminal device 104. The UE 104A can, for example, be configured as an endpoint of a video or audio streaming session that stretches via the AND 103. Different wireless terminal devices 104, such as a smartphone 104A and two IoT-type terminal devices 104B, 104C (e.g., a car and a wearable device), are serviced by the CND 102 via, e.g., a base station (not shown) of the AND 103. The terminal devices 104A, 104B and 104C are collectively denoted by reference numeral 104.

Figure 2:
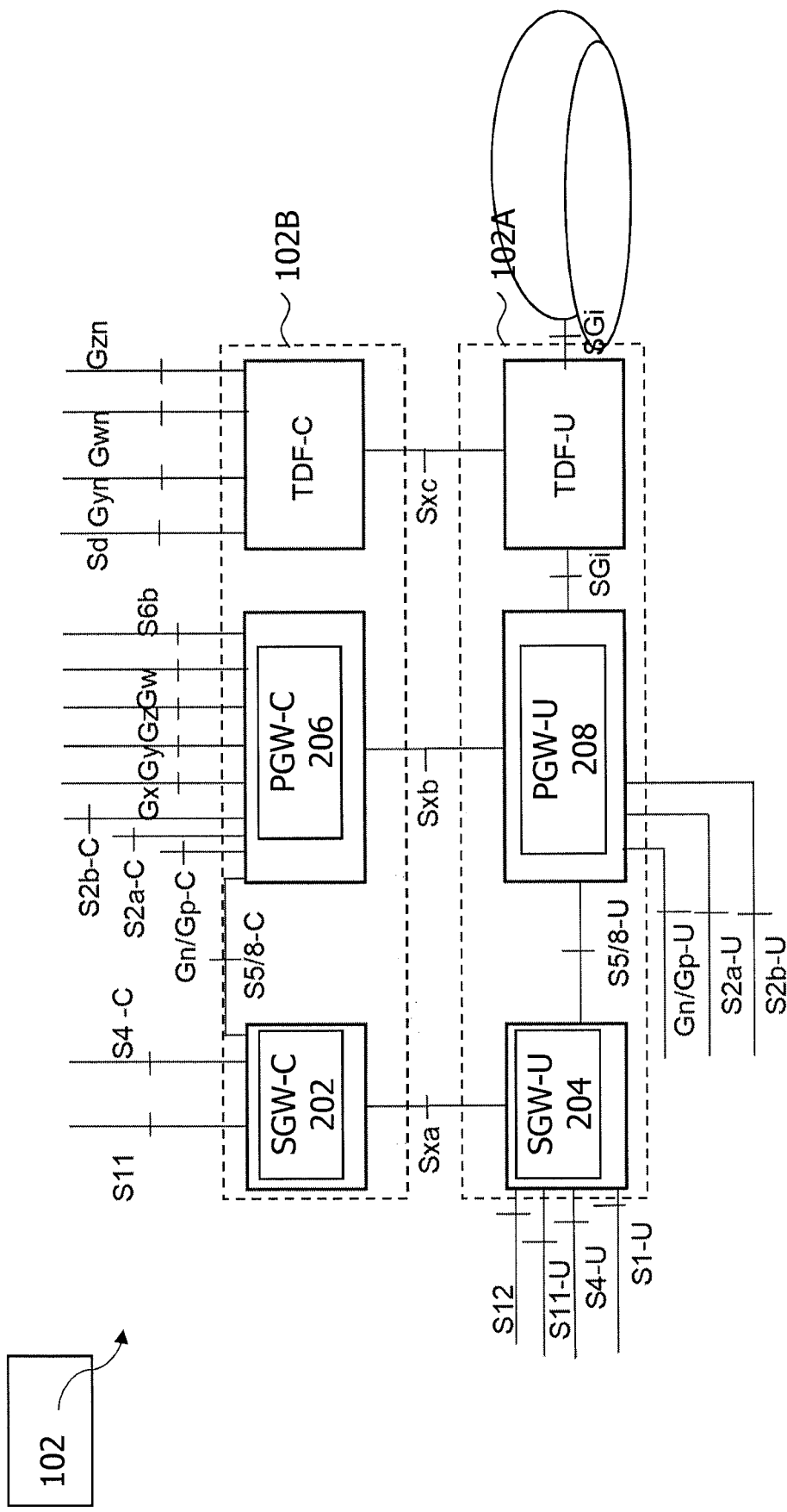
FIG. 2 is a diagram illustrating an exemplary CN domain in accordance with an embodiment the present disclosure.

FIG. 2 shows a diagram illustrating an exemplary architecture of a portion of the CND 102 in accordance with the present disclosure. The CND 102 shown in FIG. 2 has the architecture of an Evolved Packet Core (EPC) in accordance with 3GPP's 5G reference architecture. The CND 102 is separated into a UP 102A and a CP 102B, which separation is commonly referred to as Control and User Plane Separation (CUPS). As can be seen, a Serving Gateway (SGW) is separated into a Serving Gateway in the CP (SGW-C 202) and a Serving Gateway in the UP (SGW-U 204). Similarly, a Packet Data Network- (PDN-) Gateway (PGW) is separated into a PGW-C 206 in the CP and a PGW-U 208 in the UP. A Traffic Detection Function TDF may also be provided in a separated manner (TDF-U and TDF-C).

The SGW-U 204 has an S5/8-U communication interface to the PGW-U 208 and vice versa. The SGW-C 202 has an S5/8-C communication interface to the PGW-C 206 and vice versa. The SGW-C 202 has an Sxa communication interface to the SGW-U 204 and vice versa. The PGW-C 206 has an Sxb communication interface to the PGW-U 208 and vice versa. A session established between the SGW-C 202 and the SGW-U 204 over the Sxa interface may be identified by a corresponding (Sxa) session identifier. Similarly, a session established between the PGW-C 206 and the PGW-U 208 over the Sxb interface may be identified by a corresponding (Sxb) session identifier. A Packet Forwarding Protocol (PFCP) may be used for sessions over the Sxa interface and/or the Sxb interface. The PFCP may comply with the specifications of 3GPP. Generally speaking, PFCP defines a packet forwarding model that includes a procedure to classify data packet flows using packet detection rules (PDRs). Each PDR contains packet detection information (PDI) in the form of one or more match fields against which incoming data packets are matched on the user plane. Moreover, each PDR is associated with one or more actions (e.g., forwarding, duplicating, buffering, dropping, measuring) that are to be applied to the matching data packets.

The SGW-U 204 may have an S1-U communication interface to the AND 103, for example to a network node of a RAN, for sending and receiving UP data packets. UP data packets may be transmitted on the UP of the CND 102 via the SGW-U 204 and the PGW-U 208 or in the reverse direction. The PGW-U 208 may have an SGi-interface allowing a transfer of UP data packets toward the content provider system 101, namely, toward the application server 105, and in the opposite direction. This allows for a transfer of data packets as application traffic between the terminal devices 104 and the application server 105.

Figure 3:
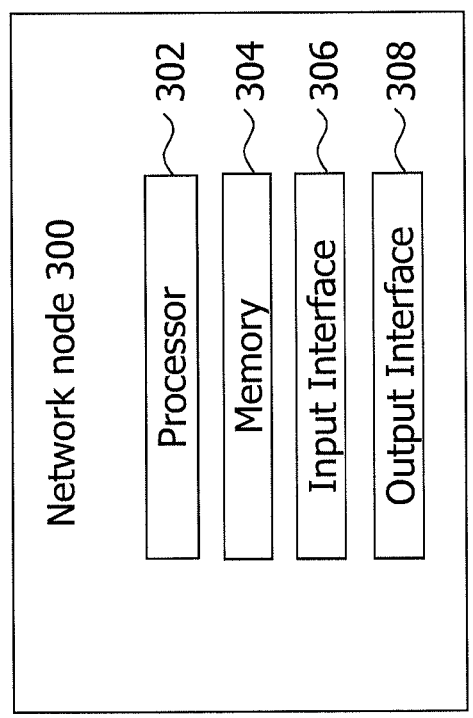
FIG. 3 is a block diagram illustrating an apparatus embodiment of a network node in accordance with the present disclosure.

FIG. 3 illustrates an embodiment of a network node 300 in accordance with the present disclosure. The network node 300 is configured to implement one or more EPC gateways such as the SGW-C 202, the SGW-U 204, the PGW-C 206 and/or the PGW-U 208. The network node 300 comprises a processor 302, a memory 304, an input interface 306 and an output interface 308. The memory 304 comprises instructions which, when executed by the processor 302, cause the processor to perform one or more of the methods described herein. As understood herein, a processor, such as the processor 202, may be implemented using any processing circuitry and is not limited to, for example, a single processing core but may also have a distributed topology.

FIGS. 4 to 7 show flow diagrams of four different methods in accordance with the present disclosure. Each of the methods may be performed by the network node 300. For instance, the memory 304 of the network node 300 may comprise instructions which, when executed by the processor 302, cause the processor to perform one or more of the methods shown in FIGS. 4 to 7.

Figure 4:
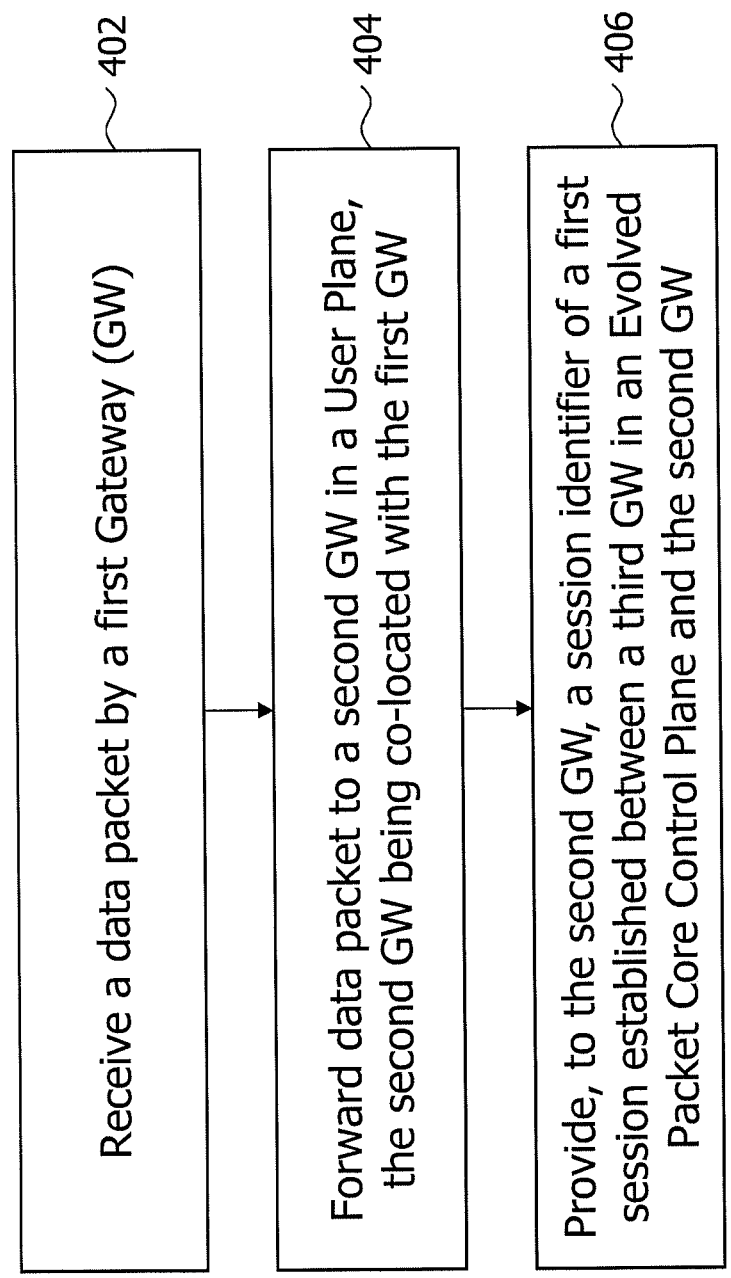

The method shown in FIG. 4 is performed by a first gateway, GW. In other words, the first GW is configured to perform the method shown in FIG. 4. The first GW is a GW in the UP of an EPC with CUPS, such as the EPC shown in FIG. 2. The network node 300 may be configured as the first GW.

In a step 402, the first GW receives a data packet (e.g., a PDU on a dedicated layer of the OSI model). The data packet may be received via the input interface 306. The data packet may be a user plane data packet and may be part of an application traffic.

In a step 404, the first GW forwards the data packet to a second GW in the UP co-located with the first GW. The data packet may be forwarded by transmitting it via the output interface 308.

In a step 406, the first GW provides, to the second GW, a session identifier of a first session established between a third GW in the CP of the EPC and the second GW. The session identifier may be provided to the second GW via the output interface 308.

Figure 5:
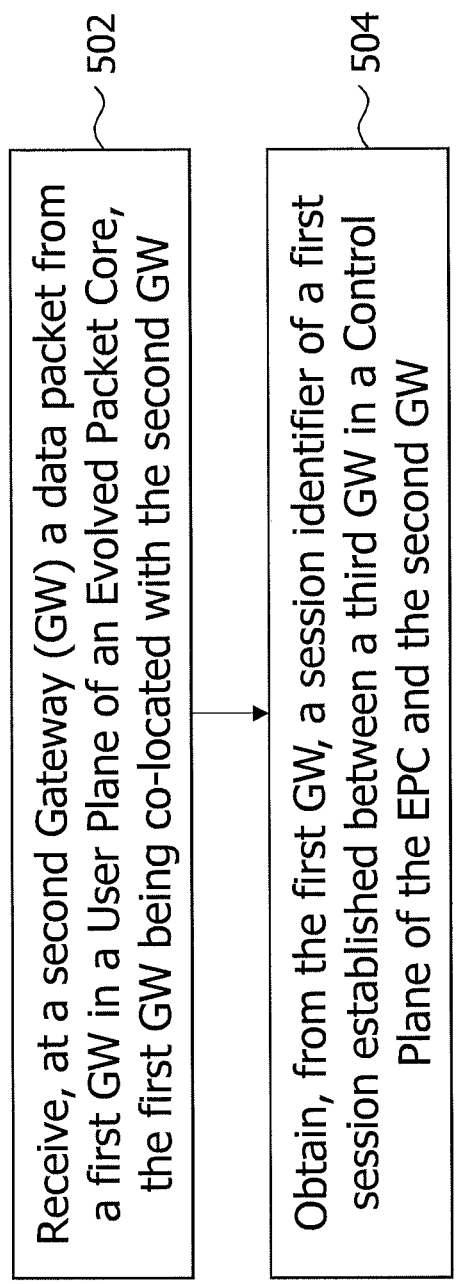

The method shown in FIG. 5 is performed by a second GW. In other words, the second GW is configured to perform the method shown in FIG. 5. The second GW is a GW in the UP of an EPC with CUPS, such as the EPC shown in FIG. 2. The network node 300 may be configured as the second GW.

In a step 502, the second GW receives a data packet from the first GW. The data packet may be a user plane data packet and may be part of an application traffic. The data packet may be received via the input interface 306.

In a step 504, the second GW obtains, from the first GW, a session identifier of a first session established between a third GW in the CP of the EPC and the second GW. The session identifier may be obtained via the input interface 306.

The method shown in FIG. 6 is performed by a third GW. In other words, the third GW is configured to perform the method shown in FIG. 6. The third GW is a GW in the CP of an EPC with CUPS, such as the EPC shown in FIG. 2. The network node 300 may be configured as the third GW.

In a step 602, the third GW transmits, for example via the output interface 308, to a fourth GW in the CP of the EPC, a session identifier of a first session established between a second GW in a UP of the EPC and the third GW. The first GW is co-located with a first GW in the UP of the EPC. The first GW has a communication interface to the fourth GW.

Figure 7:
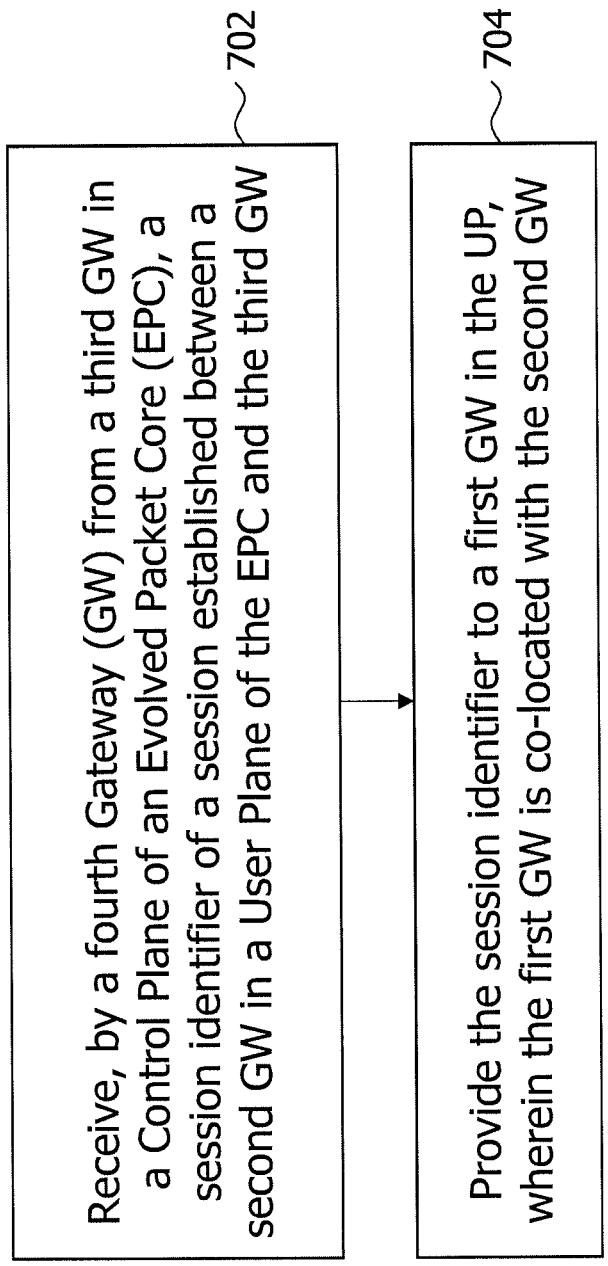

The method shown in FIG. 7 is performed by a fourth GW. In other words, the fourth GW is configured to perform the method shown in FIG. 7. The fourth GW is a GW in the CP of an EPC with CUPS, such as the EPC shown in FIG. 2. The network node 300 may be configured as the fourth GW.

In a step 702, the fourth GW receives, from a third GW in the CP of the EPC, a session identifier of a first session established between a second GW in a UP of the EPC and the third GW. The session identifier may be received via the input interface 306.

In a step 704, the fourth GW provides the session identifier of the first session to a first GW in the UP of the EPC, wherein the first GW is co-located with the second GW. The session identifier may be provided via the output interface 308.

In the methods of FIGS. 4 to 7, the first GW is, for example physically, co-located with the second GW in the UP of the EPC. The first GW may be implemented in a same network node or in a same co-location center or carrier hotel as the second GW. For example, the network node 300 is configured as both the first and the second GW. In one example, the SGW-C 202 and the PGW-C 206 are also co-located.

In an uplink variant of the methods shown in FIGS. 4 to 7, the first GW is the SGW-U 204, the second GW is the PGW-U 208, the third GW is the PGW-C 206 and the fourth GW is the SGW-C 202. In a downlink variant, the first GW is the PGW-U 208, the second GW is the SGW-U 204, the third GW is the SGW-C 202 and the fourth GW is the PGW-C 206. In an uplink variant, the session identifier may be an identifier of an Sxb session between the PGW-C 206 and the PGW-U 208. In a downlink variant, the session identifier may be an identifier of an Sxa session between the SGW-C 202 and the SGW-U 204.

The present disclosure also provides for a system comprising a network node 300 configured as at least one of the third and the fourth GW, and a network node 300 configured as at least one of the first and the second GW. The system may comprise a first network node 300 configured as the SGW-C 202, a second network node 300 configured as the PGW-C 206, and one or more network nodes 300 configured as at least one of the SGW-U 204 and the PGW-U 208.

The present disclosure also provides for a computer program comprising instructions which, when the program is executed by a processor such as the processor 302, cause the processor to carry out the steps performed by one or more of the SGW-C 202, the SGW-U 204, the PGW-C 206 and the PGW-U 408 as described herein, for example the steps of one or more of the methods shown in FIGS. 4 to 7. The present disclosure is also directed to a computer-readable medium comprising instructions which, when executed by a processor such as the processor 302, cause the processor to carry out steps performed by one or more of the SGW-C 202, the SGW-U 204, the PGW-C 206 and the PGW-U 408 as described herein, for example the steps of one or more of the methods shown in FIGS. 4 to 7. The computer-readable medium may be a signal wave, a data carrier signal, a non-transitory storage medium, a read-only memory or the like.

It is noted that the "first GW", the "second GW", the "third GW", the "fourth GW", the "data packet" and the "session identifier" mentioned herein above may refer to the same entities in the uplink variant. Likewise, the "first GW", the "second GW", the "third GW", the "fourth GW", the "data packet" and the "session identifier" mentioned herein above may refer to the same entities in the downlink variant. This will be apparent in view of the following description of FIGS. 8 to 11.

FIGS. 8 to 11 show schematic signaling diagrams in accordance with the present disclosure. The signaling represents an efficient communication procedure for co-located gateways. As can be seen, several steps involve the SGW-C 202, the PGW-C 206, the SGW-U 204 and the PGW-U 208. The network node 300 shown in FIG. 3 may be configured as either one of these gateways. The procedure shown in FIGS. 5 to 11 may be implemented using the system described herein, e.g., using a plurality of network nodes 300 configured as different GWs.

Steps 1 to 4 relate to a PFCP Association procedure between the SGW-U 204 and the SGW-C 202.

In step 1 shown in FIG. 7, the SGW-U 204 transmits a first capability indication to the SGW-C 202. The first capability indication may be transmitted together with or within a PFCP Association Request message to the SGW-C 202, for example via the Sxa interface. The first capability indication indicates that the SGW-U 204 is co-located with the PGW-U 208, and may further indicate that the SGW-U 204 is configured to perform the signaling steps as described in the following with reference to FIGS. 8 to 11. The first capability indication may indicate that the SGW-U 204 is capable of a "Co-located SGW-PGW Optimization" (CSPO) procedure, as described herein. The transmission of the first capability indication allows the SGW-C 202 to know which SGW-U 204 supports the corresponding capability. In consequence, the SGW-C 202 can select the SGW-U 204 from a plurality of SGW-Us based on the received first capability indication. The first capability indication transmitted in step 1 may be transmitted together with one or more additional capability indications of the SGW-U 204 shown in table 1 below. The selection of the SGW-U 204 by the SGW-C 202 may be further based on the one or more additional capability indications.

In step 2, the SGW-C 202 sends a response message to the SGW-U 204. The response message is for example a PFCP Association Response message. The response message may be transmitted to the SGW-U 204 via the Sxa interface. The response message may be or comprise an acknowledgement of receipt of the PFCP Association Request message or of the first capability indication.

Similarly, in step 3, the PGW-U 208 sends a second capability indication to the PGW-C 206. An existing mechanism of the PFCP association process may thereby be extended or modified. The second capability indication may be transmitted to the PGW-C 206 together with or within a PFCP Association Request message, for example via the Sxb interface. The second capability indication indicates that the PGW-U 208 is co-located with the SGW-U 204, and may further indicate that the PGW-U 208 is configured to perform the signaling steps as described in the following with reference to FIGS. 8 to 11. The second capability indication may indicate that the PGW-U 208 is capable of a "Co-located SGW-PGW Optimization" (CSPO). This allows the PGW-C 206 to know which PGW-U 208 supports the corresponding capability. In consequence, the PGW-C 206 can select the PGW-U 208 from a plurality of PGW-Us based on the received second capability indication. The second capability indication transmitted in step 3 may be transmitted together with one or more additional capability indications of the PGW-U 208 shown in table 1 below. The selection of the PGW-U 208 by the PGW-C 206 may be further based on the one or more additional capability indications.

In step 4, the PGW-C 206 sends a response message to the PGW-U 208. The response message may be a PFCP Association Response message. The response message may be transmitted via the Sxb interface. The response message may be or comprise an acknowledgement of receipt of the PFCP Association Request message or of the second capability indication.

In table 1 below, the column "Feature Octet/Bit" lists an octet and bit number within the Supported-Features Information Element (IE) for each capability. The "Feature" column provides short names, each of which is associated to the octet and bit number and a corresponding capability. The column "Interface" lists a set of applicable interfaces for each capability. The column "Description" gives a textual description for each of the capabilities. The first capability indication transmitted in step 1 may be an indication of the capability of the SGW-U 204 with the short name "CSPO" as shown in table 1. The second capability indication transmitted in step 3 may be an indication of the capability of the PGW-U 208 with the short name "CSPO" as shown in table 1. It is noted that an alternative short name, octet/bit number or textual description may be used when transmitting the (e.g., first or second) capability indication described herein.

TABLE 1

Capabilities of the UP GW (SGW-U 204 or PGW-U 208)

| Feature Octet/ Bit | Feature | Interface | Description |
|---|---|---|---|
| 5/1 | BUCP | Sxa, N4 | Downlink Data Buffering in CP function is supported by the UP GW |
| 5/2 | DDND | Sxa, N4 | The buffering parameter 'Downlink Data Notification Delay' is supported by the UP GW |
| 5/3 | DLBD | Sxa, N4 | The buffering parameter 'DL Buffering Duration' is supported by the UP GW |
| 5/4 | TRST | Sxb, Sxc, N4 | Traffic Steering is supported by the UP GW |
| 5/5 | FTUP | Sxa, Sxb, N4 | F-TEID allocation/release in the UP function is supported by the UP GW |
| 5/6 | PFDM | Sxb, Sxc, N4 | The PFD Management procedure is supported by the UP GW |
| 5/7 | HEEU | Sxb, Sxc, N4 | Header Enrichment of Uplink traffic is supported by the UP GW |
| 5/8 | TREU | Sxb, Sxc, N4 | Traffic Redirection Enforcement in the UP function is supported by the UP GW |
| 6/1 | EMPU | Sxa, Sxb, N4 | Sending of End Marker packets supported by the UP GW |
| 6/2 | PDIU | Sxa, Sxb, Sxc, N4 | Support of PDI optimized signaling in UP GW |
| 6/3 | UDBC | Sxb, Sxc, N4 | Support of UL/DL Buffering Control |

TABLE 1-continued

Capabilities of the UP GW (SGW-U 204 or PGW-U 208)

| Feature Octet/Bit | Feature | Interface | Description |
|---|---|---|---|
| 6/4 | QUOAC | Sxb, Sxc, N4 | The UP GW supports being provisioned with the Quota Action to apply when reaching quotas |
| 6/5 | TRACE | Sxa, Sxb, Sxc, N4 | The UP GW supports Trace |
| 6/6 | FRRT | Sxb, N4 | The UP GW supports Framed Routing |
| 6/7 | PFDE | Sxb, N4 | The UP GW supports PFD Contents including a property with multiple values |
| 6/8 | EPFAR | Sxa, Sxb, Sxc, N4 | The UP GW supports the Enhanced PFCP Association Release feature |
| 7/1 | DPDRA | Sxb, Sxc, N4 | The UP GW supports Deferred PDR Activation or Deactivation |
| 7/2 | ADPDP | Sxa, Sxb, Sxc, N4 | The UP GW supports the Activation and Deactivation of Pre-defined PDRs |
| 7/3 | UEIP | N4 | The UP GW supports allocating UE IP addresses or prefixes |
| 7/4 | SSET | N4 | UP GW supports PFCP sessions successively controlled by different SMFs of a same SMF Set |
| 7/5 | MNOP | Sxa, Sxb, Sxc, N4 | UP GW supports measurement of number of packets which is instructed with the flag 'Measurement of Number of Packets' in a URR |
| 7/6 | MTE | N4 | UP GW supports multiple instances of Traffic Endpoint IDs in a PDI |
| 7/7 | BUNDL | Sxa, Sxb, Sxc, N4 | PFCP messages bundling is supported by the UP GW |
| 7/8 | GCOM | N4 | UP GW supports 5G VN Group Communication |
| 8/1 | MPAS | N4 | UP GW supports multiple PFCP associations to the SMFs in an SMF set |
| 8/2 | RTTL | N4 | UP GW supports redundant transmission at transport layer |
| 8/3 | VTIME | Sxb, N4 | UP GW supports a quota validity time feature |
| 8/4 | CSPO | Sxa, Sxb | Co-located SGW-PGW Optimization is supported by the UP GW |

Steps 5 to 19 relate to a Packet Data Network (PDN) Connection Establishment. The sequence diagrams in FIGS. 5 to 11 do not include all the signaling messages involved in the PDN Connection Establishment procedure as currently defined by the 3GPP. For sake of simplicity, only the relevant signaling steps, most of which deviate from known solutions, are shown and described herein.

In step 5, a terminal device such as the UE 104A triggers a PDN Connection Establishment procedure. In the shown example, the UE 104A sends a PDN Connectivity Request message to an MME 802. The MME 802 may be comprised in the EPC but is not shown in FIGS. 1 and 2 for simplicity. The MME 802 may be triggered by the PDN Connectivity Request message to select a SGW-C 202 to manage the PDN session and sends, in step 6, a Create Session Request message to the selected SGW-C 202.

In step 7, the SGW-C 202 selects an SGW-U 204 and provides, to the selected SGW-U 204, an Sxa session identifier of a session between the SGW-C 202 and the SGW-U 204. The SGW-U 204 may select the SGW-U 204 based on the first capability indication. For example, the SGW-U 204 may select the SGW-U 204 supporting the CSPO capability from a plurality of SGW-Us in the UP of the CN 102. The session identifier of the session between the SGW-C 202 and the SGW-U 204 may be transmitted together with or within an Sxa PFCP Session Establishment Request message.

The SGW-U 204, if accepting the Request, answers the SGW-C 202 with a response message in step 8. The response message may be an (e.g., successful or acknowledging) Sxa PFCP Session Establishment Response message.

In case the SGW-C 202 and PGW-C 206 are co-located, for example implemented in the same network node 300, the combined SGW-C/PGW-C may optimize the selection of the UP GW by selecting the best couple of SGW-U 204 and PGW-U 208, among a plurality of candidate couples of {SGW-U, PGW-U}, instead of selecting, independently, the SGW-U 204 and the PGW-U 208.

In step 9, the SGW-C 202 selects a PGW-C 206 and transmits the Sxa session identifier of the session between the SGW-C 202 and the SGW-U 204 to the selected PGW-C 206. The Sxa session identifier may be transmitted over the S5/8-interface between the SGW-C 202 and the PGW-C 206. The Sxa session identifier may be transmitted together with or within an S5/8-C Create Session Request message to the selected PGW-C 206. The SGW-C 202 may further transmit an identifier of the selected SGW-U 204 instance to the PGW-C 206, referred to as "SGW-U instance identifier" in FIG. 4, and also referred to as "GW identifier" herein. The SGW-U instance identifier may be transmitted together with or within the S5/8-C Create Session Request message. Note that step 9 is a (downlink variant) example of the signaling shown in FIG. 6.

In step 10, the PGW-C 206 transmits a Policy Request message to a Policy and Charging Rules Function (PCRF) 804. In Step 11, the PCRF 804 answers with a Policy Response message.

In step 12, the PGW-C 206 selects the PGW-U 208 co-located to the SGW-U 204. The PGW-C 206 may select the co-located PGW-U 208 based on the SGW-U instance identifier received from the SGW-C 202. For example, the PGW-C 206 selects the PGW-U 208 from a plurality of PGW-Cs based on the SGW-U instance identifier. The PGW-C 206 may determine which of the plurality of PGW-Us is co-located with the SGW-U 204 identified by the SGW-U instance identifier and select one of the co-located PGW-Us. The PGW-C 206 may select the PGW-U 208 based on additional criteria such as a current traffic over each of the PGW-Us, one or more additional capabilities of each PGW-U (e.g., one or more of the capabilities shown in table 1), or the like.

Figure 8:
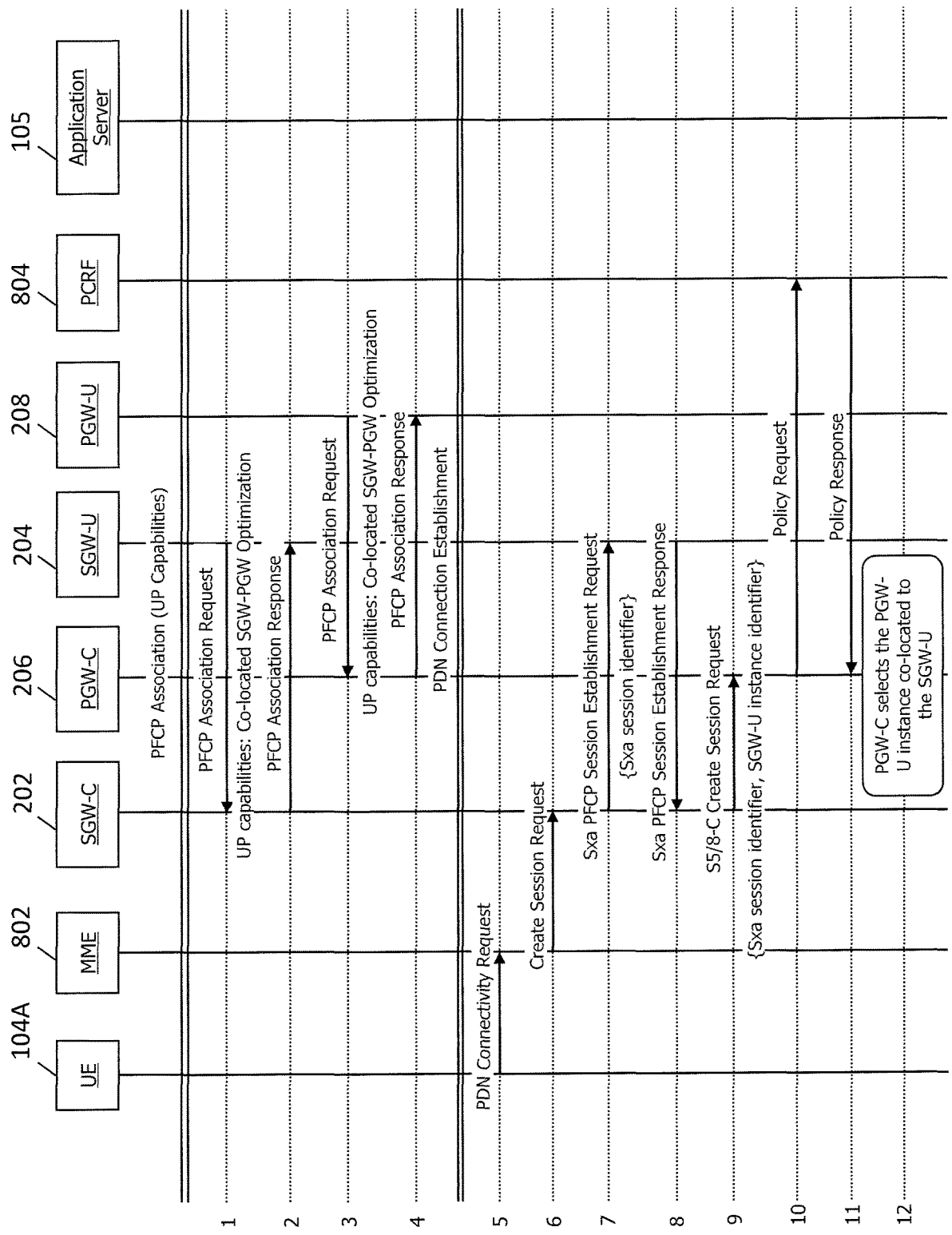
FIGS. 8 to 11 illustrate a signaling diagrams in accordance with embodiments of the present disclosure.
Figure 9:
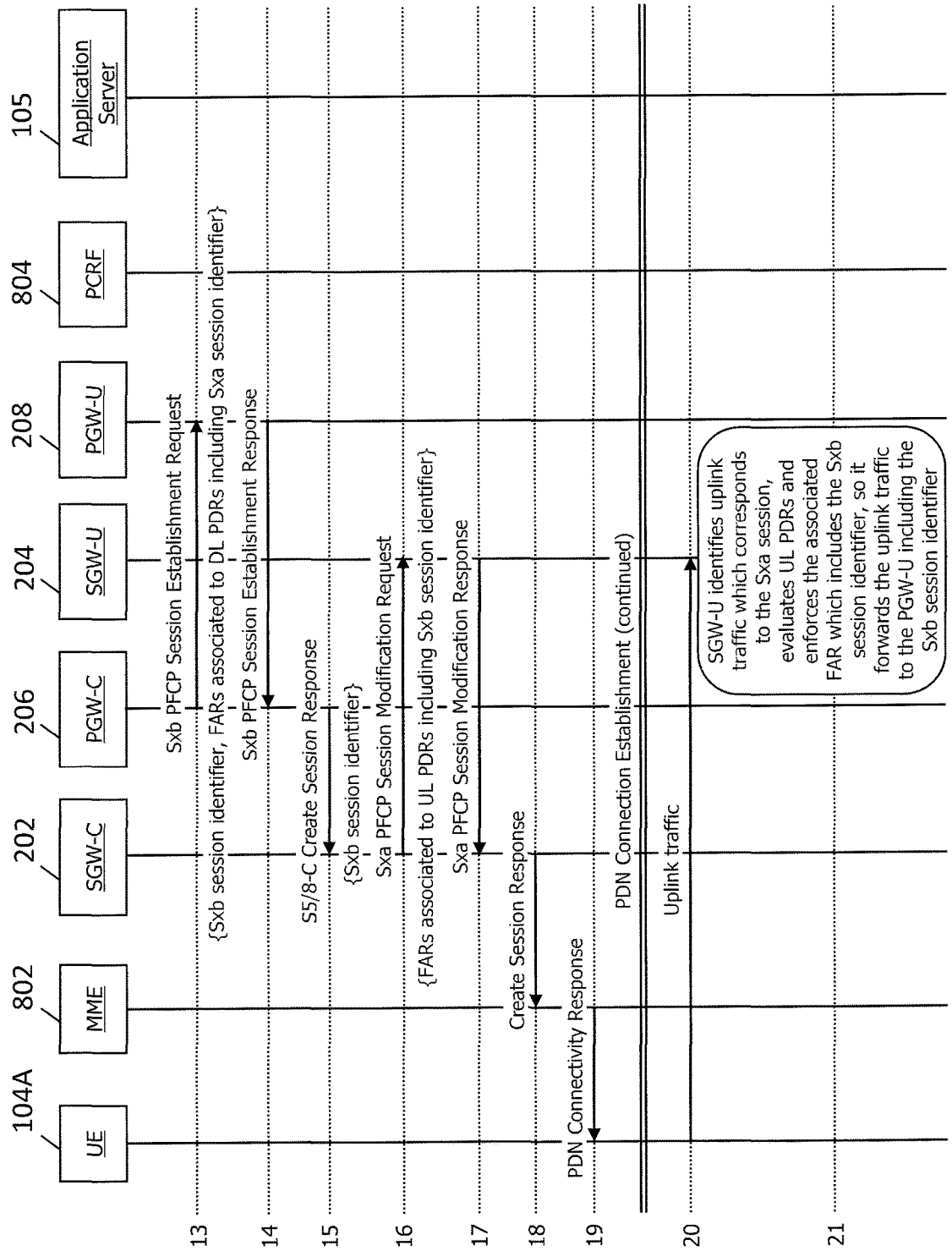

In step 13 shown in FIG. 8, the PGW-C 206 provides an Sxb session identifier of a session between the PGW-C 206 and the PGW-U 208 to the PGW-U 208. The Sxb session identifier may be transmitted together with or within an Sxb PFCP Session Establishment Request message to the PGW-U 208. The message may further comprise at least one of the corresponding Packet Detection Rules (PDRs), Forwarding Action Functions (FARs), Quality of Service (QoS) Enforcement Rules (QERs) and Usage Reporting Rules (URRs). The PGW-C 206 further provides the Sxa session identifier to the PGW-U 208. The Sxa session identifier may be transmitted via the Sxb interface between the PGW-C 206 and the PGW-U 208. The Sxa session identifier may be transmitted with or within the Sxb PFCP Session Establishment Request message. Put differently, the PGW-C 206, after receiving, from the SGW-C 202, the Sxa session identifier, provides, in step 13, the Sxa session identifier to the PGW-U 208. The PGW-C 206 may be configured to trigger the PGW-U 208 to associate the Sxa session identifier with a first (e.g., downlink) PDR. The PGW-C 206 may further trigger the PGW-U 208 to include the Sxa session identifier in at least one first FAR associated with the first PDR. The at least one first FAR may not include an OHC-IE. In other words, the PGW-U 208 obtains the Sxa session identifier of the session between the SGW-C 202 and the SGW-U 204 from the PGW-C 206. The PGW-U 208 may associate the Sxa session identifier obtained from the SGW-C 202 with a second (e.g., downlink) PDR. The PGW-U 208 may include the Sxb session identifier obtained from the SGW-C 202 in at least one second FAR associated with the second PDR. The at least one second FAR does for example not include an OHC-IE. The first PDR may correspond to the second PDR. The at least one first FAR may correspond to the at least one second FAR. In one example, the Sxb PFCP Session Establishment Request message comprises at least one of the first PDR, the second PDR, the at least one first FAR and the at least one second FAR. The PGW-U 208 may update the (e.g., downlink) FARs associated to the (e.g., downlink) PDRs by including the Sxa session identifier. Note that step 13 is a (downlink variant) example of the signaling shown in FIG. 7.

In step 14, the PGW-U 208 answers by transmitting, to the PGW-C 206, a response message. The response message may be an Sxb PFCP Session Establishment Response message that may indicate an acknowledgement of receipt or acceptance of the Sxb PFCP Session Establishment Request message.

In step 15, the PGW-C 206 transmits, to the SGW-C 202, the Sxb session identifier. The Sxb session identifier may be transmitted over the S5/8-interface between the PGW-C 206 and the SGW-C 202. The Sxb session identifier may be transmitted together with or within an S5/8-C Create Session Response message. Note that step 15 is an (uplink variant) example of the signaling shown in FIG. 6.

In step 16, the SGW-C 202 provides the Sxb session identifier to the SGW-U 204. The Sxb session identifier may be transmitted via the Sxa interface between the SGW-C 202 and the SGW-U 204. The Sxb session identifier may be transmitted together with or within an Sxa PFCP Session Modification Request message. The Sxa PFCP Session Modification Request message may further comprise at least one of the corresponding Packet Detection Rules (PDRs), Forwarding Action Functions (FARs), Quality of Service (QoS) Enforcement Rules (QERs) and Usage Reporting Rules (URRs). Put differently, the SGW-C 202, after receiving, from the PGW-C 206, the Sxb session identifier, provides, in step 16, the Sxb session identifier to the SGW-U 204. The SGW-C 202 may be configured to trigger the SGW-U 204 to associate the Sxb session identifier with a third (e.g., uplink) PDR. The SGW-C 202 may further trigger the SGW-U 204 to include the Sxb session identifier in at least one third FAR associated with the third PDR. The at least one third FAR may not include an OHC-IE. In other words, the SGW-U 204 obtains the Sxb session identifier of the session between the PGW-C 206 and the PGW-U 208 from the SGW-C 202. The SGW-U 204 may associate the Sxb session identifier with a fourth (e.g., uplink) PDR. The SGW-U 204 may include the Sxb session identifier obtained from the SGW-C 202 in at least one fourth FAR associated with the fourth PDR. The at least one fourth FAR does for example not include an OHC-IE. The third PDR may correspond to the fourth PDR. The at least one third FAR may correspond to the at least one fourth FAR. In one example, the Sxa PFCP Session Modification Request message comprises at least one of the third PDR, the fourth PDR, the at least one third FAR and the at least one fourth FAR. The SGW-U 204 may update the (e.g., uplink) FARs associated to the (e.g., uplink) PDRs by including the Sxb session identifier. Note that step 16 is a (uplink variant) example of the signaling shown in FIG. 7.

In step 17, the SGW-U 204 answers by transmitting, to the SGW-C 202, a response message. The SGW-U 204 may transmit an Sxa PFCP Session Modification Response message to the SGW-C 202 that may indicate an acknowledgement of receipt or acceptance of the Sxa PFCP Session Modification Request message.

In step 18, the SGW-C 202 answers the MME 802 by transmitting, to the MME 802, a response message. The response message may be a Create Session Response message that may indicate that PDN Connection Establishment between the SGW and PGW entities in the CN is completed.

In step 19, the MME 802 answers the UE 104A by transmitting, to the UE 104A, a response message. The response message may be a PDN Connectivity Response message that may indicate that PDN Connection Establishment between the SGW and PGW entities in the CND 102 was successfully completed. The PDN Connectivity Response message may comprise an indication or address of one or more CND GWs, for example of the SGW-U 204, over which data packets may be transmitted using the established PDN connection.

After the PDN Connection Establishment between the SGW and PGW entities in the CN is successfully completed, the established PDN connection may be used to transmit data traffic over the UP of the CND 102 between different endpoints. Steps 20 to 24 refer to processing of UL traffic, whereas steps 25 to 29 relate to processing of DL traffic.

As an example of uplink traffic, the UE 104A may transmit a data packet to the CN in step 20. In particular, the UE 104A may send an uplink (UL) data packet to the SGW-U 204. The UL data packet may be referred to as an UL UP data packet.

In step 21, the SGW-U 204 receives the UL data packet and matches the received UL data packet with a session established between the SGW-C 202 and the SGW-U 204. The SGW-U 204 then selects at least one (e.g., uplink) PDR associated with the matching session and obtains the Sxb session identifier of the matching session based on the selected PDR. Note that the at least one PDR may correspond to the third or fourth PDR described above. The SGW-U 204 may obtain the Sxb session identifier from at least one FAR associated with the selected PDR, for example from the at least one third or the at least one fourth FAR described above. As noted above, this at least one FAR may not include an OHC-IE. In other words, when the SGW-U 204 receives the UL data packet from the UE 104A, the SGW-U 204 first identifies to which Sxa session the received UL data packet corresponds, i.e., which established Sxa session matches the received UL data packet. The SGW-U 204 then may evaluate the corresponding UL PDRs tor that session. When there is an UL PDR matching the received UL data packet, the corresponding enforcement action(s) may be applied. Specifically, a corresponding FAR may be applied which indicates to forward the UL data packet to the PGW-U 208 by including the Sxb session identifier and/or to forward or transmit the UL data packet while avoiding tunnel creation.

Figure 10:
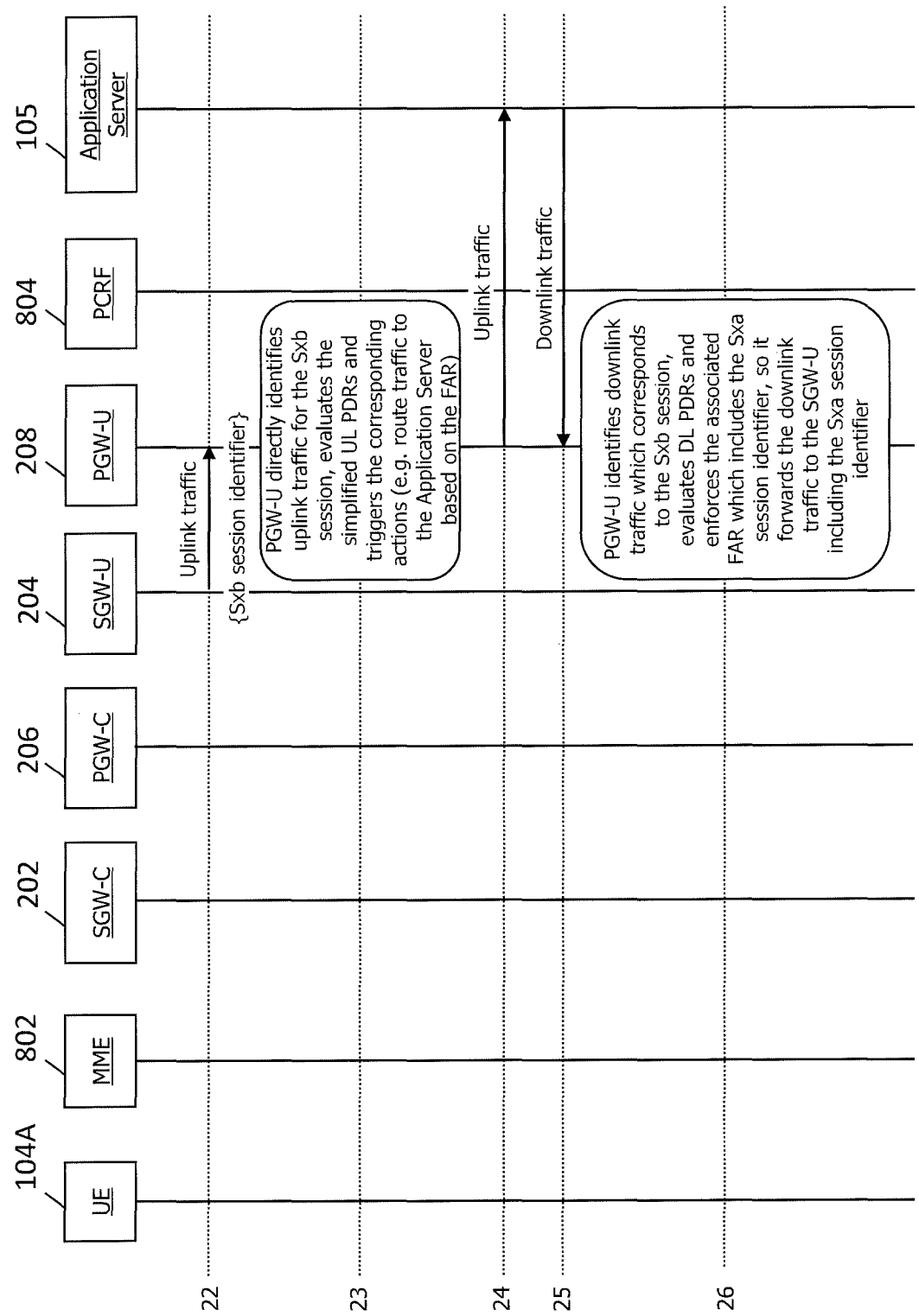

In step 22 shown in FIG. 10, the SGW-U 204 forwards the UL data packet to the PGW-U 208 co-located to the SGW-U 204. The UL data packet may be forwarded in accordance with the at least one corresponding (e.g., third or fourth) FAR. The SGW-U 204 also provides, to the PGW-U 208, the Sxb session identifier. The Sxb session identifier may be provided by sending it with or in the forwarded UL data packet. The UL data packet may be forwarded while avoiding tunnel creation under a General Packet Radio Service Tunneling Protocol (GTP) between the SGW-U 204 and the PGW-U 208. As the SGW-U 204 and the PGW-U 208 are co-located, there is no need to create a GTP tunnel for this. Instead, the Sxb session identifier may be included by the SGW-U 204 on a per UL packet basis. Note that steps 21 and 22 are a (uplink variant) example of the method shown in FIG. 4.

In step 23, the PGW-U 208 receives the forwarded UL data packet from the SGW-U 204. The PGW-U 208 obtains the Sxb session identifier from the SGW-U 204, for example by extracting the Sxb session identifier from the forwarded UL data packet. The PGW-U 208 may receive the forwarded UL data packet while avoiding tunnel creation under a GTP between the SGW-U 204 and the PGW-U 208. The PGW-U 208 may select at least one (e.g. uplink) PDR, associated with the session identified by the Sxb session identifier, from a plurality of (e.g. uplink) PDRs. The PGW-U 208 may select the at least one PDR without evaluating at least one parameter chosen from Network Instance (NI), Fully Qualified Tunnel Endpoint Identifier (F-TEID), and User Equipment Internet Protocol Address (UEIP). The PGW-U 208 may trigger an action to be performed with the received UL data packet based on at least one FAR associated with the selected PDR. The at least one FAR may not comprise an Outer Header Removal Information Element (OHR-IE). In other words, in step 23, the PGW-U 208 directly identifies the Sxb session based on the Sxb session identifier obtained from the SGW-U 204. This may simplify PFCP session lookup. The PGW-U 208 may evaluate corresponding UL PDRs for that Sxb session. These UL PDRs may be simplified, as it may not be necessary to evaluate several of the PDR PDI, such as the NI, F-TEID and UEIP. When there is a matched UL PDR, the PGW-U 208 may trigger the corresponding action(s), for example forward the UL data packet to another entity. Note that step 23 is an (uplink variant) example of the method shown in FIG. 5.

In step 24, the PGW-U 208 transmits the UL data packet to the application server 105. The PGW-U 208 may route the uplink traffic to the Application Server 105 by forwarding the UL data packet based on the FAR of the matching UL PDR.

As an example of downlink traffic, the Application Server 105 may transmit a downlink (DL) data packet towards the UE 104A. In particular, a DL data packet is received by the PGW-U 208 in step 25.

In step 26, the PGW-U 208 receives the DL data packet and matches the received DL data packet with a session established between the PGW-C 206 and the PGW-U 208. The PGW-U 208 then selects at least one (e.g., downlink) PDR associated with the matching session and obtains the Sxa session identifier of the matching session based on the selected PDR. Note that the at least one PDR may correspond to the first or second PDR described above. The PGW-U 208 may obtain the Sxa session identifier from at least one FAR associated with the selected PDR, for example from the at least one first or the at least one second FAR described above. As noted above, this at least one FAR may not include an OHC-IE. In other words, when the PGW-U 208 receives the DL data packet from the Application Server 105, the PGW-U 208 first identifies to which Sxb session the received DL data packet corresponds, i.e., which established Sxb session matches the received data packet. The PGW-U 208 then may evaluate the corresponding DL PDRs tor that session. When there is a DL PDR matching the received DL data packet, the corresponding enforcement action(s) may be applied. Specifically, a corresponding FAR may be applied which indicates to forward the DL data packet to the SGW-U 204 by including the Sxa session identifier and/or to forward or transmit the DL data packet while avoiding tunnel creation.

Figure 11:
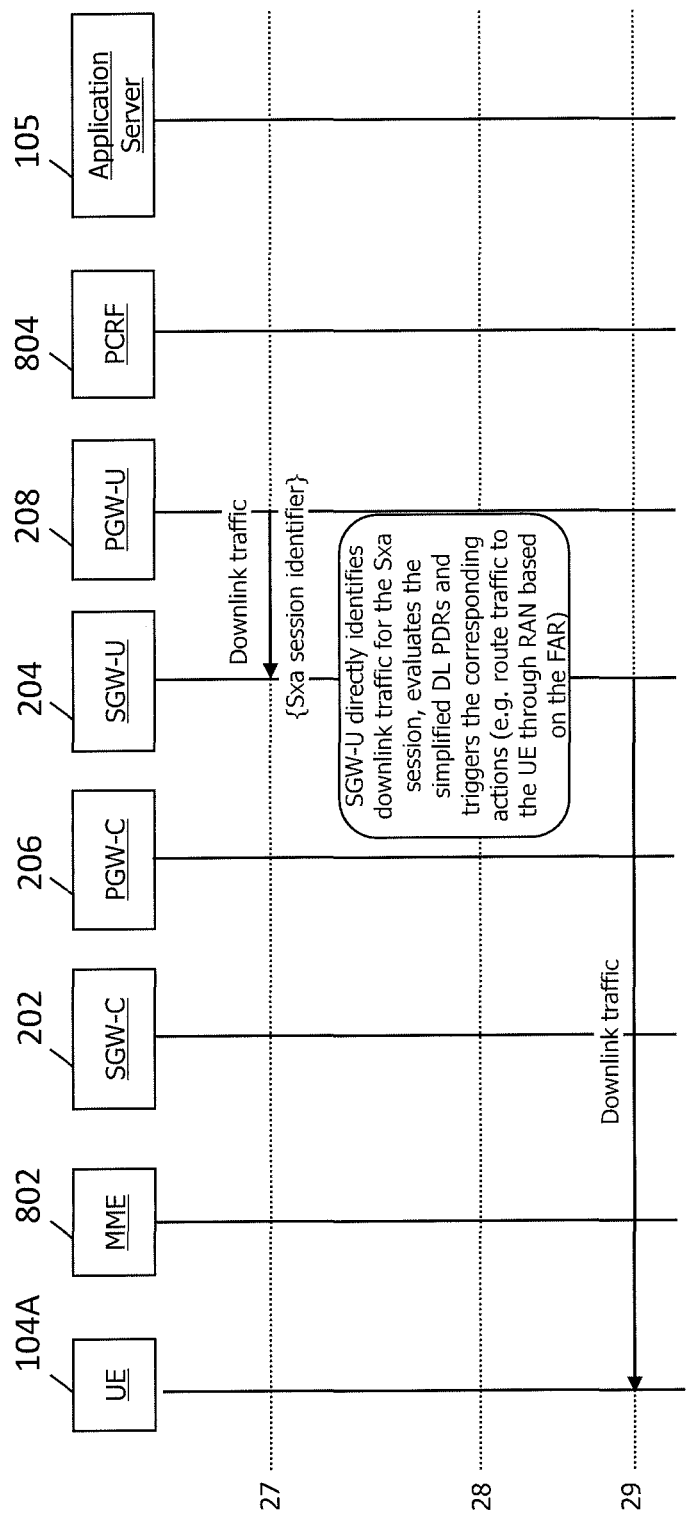

In step 27 shown in FIG. 11, the PGW-U 208 forwards the DL data packet to the SGW-U 204 co-located to the PGW-U 208. The DL data packet may be forwarded in accordance with the at least one corresponding (e.g., first or second) FAR. The PGW-U 208 also provides, to the SGW-U 204, the Sxa session identifier. The Sxa session identifier may be provided by sending it with or in the forwarded DL data packet. The DL data packet may be forwarded while avoiding tunnel creation under a GTP between the PGW-U 208 and the SGW-U 204. As the PGW-U 208 and the SGW-U 204 are co-located, there is no need to create a GTP tunnel for this. Instead, the Sxa session identifier may be included by the PGW-U 208 on a per DL packet basis. Note that steps 26 and 27 are a (downlink variant) example of the method shown in FIG. 4.

In step 28, the SGW-U 204 receives the forwarded DL data packet from the PGW-U 208. The SGW-U 204 obtains the Sxa session identifier from the PGW-U 208, for example by extracting the Sxa session identifier from the forwarded DL data packet.

The SGW-U 204 may receive the forwarded DL data packet while avoiding tunnel creation under a GTP between the SGW-U 204 and the PGW-U 208. The SGW-U 204 may select at least one (e.g. downlink) PDR, associated with the session identified by the Sxa session identifier, from a plurality of (e.g. downlink) PDRs. The SGW-U 204 may select the at least one PDR without evaluating at least one parameter chosen from Network Instance (NI), Fully Qualified Tunnel Endpoint Identifier (F-TEID), and User Equipment Internet Protocol Address (UEIP). The SGW-U 204 may trigger an action to be performed with the received DL data packet based on at least one FAR associated with the selected PDR. The at least one FAR may not comprise an Outer Header Removal Information Element (OHR-IE). In other words, in step 23, the SGW-U 204 directly identifies the Sxa session based on the Sxa session identifier obtained from the PGW-U 208. This may simplify PFCP session lookup. The SGW-U 204 may evaluate corresponding DL PDRs for that Sxa session. These DL PDRs may be simplified, as it may not be necessary to evaluate several of the PDR Packet Detection Information (PDI), such as the NI, F-TEID and UEIP. When there is a matched DL PDR, the SGW-U 204 may trigger the corresponding action(s), for example forward the DL data packet to another entity. Note that step 28 is a (downlink variant) example of the method shown in FIG. 5.

In step 29, the SGW-U 204 transmits the DL data packet to the UE 104A. The SGW-U 204 may route the downlink traffic to the UE 104A by forwarding the DL data packet based on the FAR of the matching DL PDR. The DL data packet may be forwarded from the SGW-U 204 to the UE 104A via a RAN.

In some implementations, the present disclosure thus provides a modified PFCP Association procedure in which the SGW-U 204 reports to the SGW-C 202 a so-called CSPO capability indication. This indication may allow the SGW-C 202 to select a SGW-U 204 supporting this capability on a per PFCP session basis. Similarly, the PGW-U 208 may report to the PGW-C 206 a CSPO capability indication. This indication may allow the PGW-C 206 to select a PGW-U 208 supporting this capability on a per PFCP session basis.

In some implementations, m the present disclosure also provides a modified PDN Connection establishment procedure. The S5/8-C protocol may in particular be extended or modified as follows: The SGW-C 202 indicates to the PGW-C 206 the Sxa session identifier and the selected SGW-U 204 instance. The PGW-C 206 indicates to SGW-C 202 the Sxb session identifier. Regarding the communication between the SGW-C 202 and the SGW-U 204, the PFCP is modified or extended such that the FARs associated to UL PDRs are extended with a new IE to include the Sxb session identifier, so there is no need of an Outer Header Creation IE. The DL PDRs may be simplified, as they do not need to include NI, F-TEID and UEIP. The FARs associated to DL PDRs may also be simplified, there is no need of an Outer Header Removal IE. Regarding the communication between the PGW-C 206 and the PGW-U 208, the PFCP may be modified such that the FARs associated to DL PDRs are extended with a new IE to include the Sxa session identifier, so there is no need of an Outer Header Creation IE. The UL PDRs may be simplified, so there is no need to include NI, F-TEID and UEIP. The FARs associated with UL PDRs are simplified, so there is no need of the Outer Header Removal IE.

In some implementations, the present disclosure further provides an improved data traffic processing. Regarding uplink data traffic, when the SGW-U 204 receives a user plane packet from the UE 104A, it may first identify to which Sxa session it corresponds, then evaluate the corresponding UL PDRs tor that session. When there is a match, the corresponding enforcement action(s) may be applied, specifically the FAR which indicates to forward the packet to the PGW-U 208 by including the Sxb session identifier and avoiding tunnel creation. The PGW-U 208, based on the Sxb session identifier, may directly identify the Sxb session. The PGW-U 208 may evaluate the corresponding UL PDRs tor that session, which may be simplified, as it is not necessary to evaluate many of the existing PDR PDIs (e.g. NI, UEIP, F-TEID). Regarding downlink traffic, when the PGW-U 208 receives a user plane packet (e.g., from the Internet), it may first identify to which Sxb session it corresponds, then evaluate the corresponding DL PDRs tor that session. When there is a match, the corresponding enforcement action(s) may be applied, specifically the FAR which indicates to forward the packet to the SGW-U 204 by including the Sxa session identifier and avoiding tunnel creation. The SGW-U 204, based on the above Sxa session identifier, may directly identify the Sxa session. The SGW-U 204 may evaluate the corresponding DL PDRs tor that session, which may be simplified, as it is not necessary to evaluate many of the existing PDR PDIs (e.g., NI, UEIP, F-TEID).

The present disclosure permits an efficient communication procedure in the case of co-located SGW-U/PGW-U scenarios and may provide modifications or extensions of existing S5/8- and PFCP protocols. The techniques described herein regarding traffic handling in the CN domain with CUPS in case of SGW-U/PGW-U co-location can be advantageous compared with currently known techniques.

According to the present disclosure, a plurality of procedures may not need to be duplicated for each UP data packet. For example, in some implementations, a PFCP session lookup may, in contrast to known techniques, not be done twice (not firstly for an Sxa session and secondly for an Sxb session), PDR matching may not be done twice (not once per session), and/or packet forwarding may not be done twice (not once per session), etc. A more efficient communication procedure may thus be provided which only performs a single PFCP Session lookup.

In some variants, the present disclosure provides an efficient communication mechanism to forward each packet between the SGW-U 204 and the PGW-U 208. The solution in accordance with the present disclosure works when the SGW-U 204 and PGW-U 208 are co-located, irrespective of whether the SGW-C 202 and PGW-C 206 are co-located or not.

The techniques described herein provide an efficient procedure both in terms of signaling and user plane packet processing in case of co-located SGW-U/PGW-U 208 scenarios. This may result in a faster PDN connection establishment and faster user plane packet processing, thus increasing the capacity of the SGW-U/PGW-U and reducing the latency. In consequence, a better end-to-end quality of experience (QoE) for users may be obtained.

It will be appreciated that the present disclosure has been described with reference to exemplary embodiments that may be varied in many aspects. As such, the present invention is only limited by the claims that follow.

The invention claimed is:

1. A network node comprising:
 a processor and a memory, the memory comprising instructions executable by the processor whereby the network node is configured to:
  operate as a first Gateway (GW) in a User Plane (UP) of an Evolved Packet Core (EPC) with Control and User Plane Separation (CUPS);
  receive a data packet;
  forward the data packet to a second GW in the UP, the second GW being colocated with the first GW;
  provide, to the second GW, a session identifier of a first session established between a third GW in a Control Plane (CP) of the EPC and the second GW;
  match the received data packet with a second session established between a fourth GW in the CP and the first GW, the fourth GW having a communication interface to the third GW;
  select at least one Packet Detection Rule (PDR) associated with the matching second session;
  obtain the session identifier of the first session based on the selected PDR and from at least one Forwarding Action Rule (FAR) associated with the selected PDR; and
  forward the data packet in accordance with the at least one FAR, the at least one FAR not including an Outer Header Creation Information Element (OHC-IE).

2. The network node of claim 1, further configured to provide the session identifier of the first session by sending it with or in the forwarded data packet.

3. The network node of claim 1, further configured to forward the data packet while avoiding tunnel creation under a General Packet Radio Service Tunneling Protocol (GTP) between the first GW and the second GW.

4. The network node of claim 1, further configured to obtain the session identifier of the first session from a fifth GW in the CP before receiving the data packet, wherein the fifth GW has a communication interface to the third GW.

5. The network node of claim 4, further configured to:
 associate the session identifier of the first session obtained from the fifth GW with a PDR; and
 include the session identifier of the first session obtained from the fifth GW in at least one (FAR) associated with the PDR;
 wherein the at least one FAR does not include an OHC-IE.

6. The network node of claim 1, further configured to transmit a capability indication to a sixth GW in the CP, wherein the sixth GW has a communication interface to the third GW and the capability indication indicates that the first GW is co-located with another GW in the UP.

7. The network node of claim 6, further configured to transmit the capability indication in a Packet Forwarding Control Protocol (PFCP) Association Request message.

8. A network node comprising:
a processor and a memory, the memory comprising instructions executable by the processor whereby the network node is configured to:
operate as a second Gateway (GW) in a User Plane (UP) of an Evolved Packet Core (EPC) with Control and User Plane Separation (CUPS);
receive a data packet from a first GW in the UP of the EPC, the first GW being co-located with the second GW;
obtain, from the first GW, a session identifier of a first session established between a third GW in a Control Plane (CP) of the EPC and the second GW; and
select at least one Packet Detection Rule (PDR), associated with the first session identified by the session identifier, from a plurality of PDRs, the selection being without evaluating at least one parameter chosen from Network Instance (NI), Fully Qualified Tunnel Endpoint Identifier (F-TEID), and User Equipment Internet Protocol Address (UEIP).

9. The network node of claim 8, further configured to obtain the session identifier of the first session by extracting it from the received data packet.

10. The network node of claim 8, further configured to receive the data packet while avoiding tunnel creation under a General Packet Radio Service Tunneling Protocol (GTP) between the first GW and the second GW.

11. The network node of claim 8, further configured to trigger an action to be performed with the data packet based on at least one Forwarding Action Rule (FAR) associated with the selected PDR.

12. The network node of claim 11, wherein the at least one FAR does not comprise an Outer Header Removal Information Element (OHR-IE).

13. The network node of claim 8, further configured to transmit a capability indication to the third GW, the capability indication indicating that the second GW is co-located with another GW in the UP.

14. The network node of claim 13, further configured to transmit the capability indication in a Packet Forwarding Control Protocol (PFCP) Association Request message.

15. A method performed by a first gateway (GW) in a User Plane (UP) of an Evolved Packet Core (EPC) with Control and User Plane Separation (CUPS), the method comprising:
receiving a data packet;
forwarding the data packet to a second GW in the UP, the second GW being co-located with the first GW;
providing, to the second GW, a session identifier of a first session established between a third GW in a Control Plane (CP) of the EPC and the second GW;
matching the received data packet with a second session established between a fourth GW in the CP and the first GW, the fourth GW having a communication interface to the third GW;
selecting at least one Packet Detection Rule (PDR) associated with the matching second session;
obtaining the session identifier of the first session based on the selected PDR and from at least one Forwarding Action Rule (FAR) associated with the selected PDR; and
forwarding the data packet in accordance with the at least one FAR, the at least one FAR not including an Outer Header Creation Information Element (OHC-IE).

16. A method performed by a second gateway (GW) in a User Plane (UP) of an Evolved Packet Core (EPC) with Control and User Plane Separation (CUPS), the method comprising:
receiving a data packet from a first GW in the UP of the EPC, the first GW being colocated with the second GW;
obtaining, from the first GW, a session identifier of a first session established between a third GW in a Control Plane (CP) of the EPC and the second GW; and
selecting at least one Packet Detection Rule (PDR), associated with the first session identified by the session identifier, from a plurality of PDRs, the selection being without evaluating at least one parameter chosen from Network Instance (NI), Fully Qualified Tunnel Endpoint Identifier (F-TEID), and User Equipment Internet Protocol Address (UEIP).

* * * * *